United States Patent
Park et al.

(10) Patent No.: US 9,712,355 B1
(45) Date of Patent: Jul. 18, 2017

(54) SPREADING TECHNIQUES FOR FREQUENCY-SHIFT KEYING MODULATION

(71) Applicant: QUALCOMM Incorporated, San Diego, CA (US)

(72) Inventors: Seyong Park, San Diego, CA (US); Wei Zeng, San Diego, CA (US); Joseph Binamira Soriaga, San Diego, CA (US); Jay Kumar Sundararajan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/264,967

(22) Filed: Sep. 14, 2016

Related U.S. Application Data

(60) Provisional application No. 62/277,305, filed on Jan. 11, 2016.

(51) Int. Cl.
| | | |
|---|---|---|
| *H04L 27/00* | (2006.01) | |
| *H04L 27/10* | (2006.01) | |
| *H04L 27/34* | (2006.01) | |
| *H04L 27/18* | (2006.01) | |
| *H04W 88/02* | (2009.01) | |

(52) U.S. Cl.
CPC .............. *H04L 27/10* (2013.01); *H04L 27/18* (2013.01); *H04L 27/34* (2013.01); *H04W 88/02* (2013.01)

(58) Field of Classification Search
CPC ......... H04L 27/10; H04L 27/34; H04L 27/18; H04W 88/02
See application file for complete search history.

(56) References Cited

U.S. PATENT DOCUMENTS

| | | | |
|---|---|---|---|
| 5,150,377 A | 9/1992 | Vannucci | |
| 5,745,480 A * | 4/1998 | Behtash | H04J 13/00 370/252 |
| 7,020,111 B2 | 3/2006 | Ozluturk et al. | |
| 7,200,342 B2 | 4/2007 | Dafesh | |
| 7,236,546 B2 * | 6/2007 | Egnor | H03M 13/2957 375/262 |
| 7,430,253 B2 * | 9/2008 | Olson | H04B 1/71052 375/316 |
| 8,345,735 B2 | 1/2013 | Kang et al. | |
| 2002/0051434 A1 | 5/2002 | Ozluturk et al. | |

(Continued)

*Primary Examiner* — Dac Ha
(74) *Attorney, Agent, or Firm* — Arent Fox, LLP

(57) ABSTRACT

Various aspects described herein relate to distinguishing frequency shift keying (FSK) signals transmitted by each user of multiple users in a wireless communications system. One or more symbols for transmitting in an FSK-modulated signal can be obtained by a user. The one or more symbols can be encoded based on a tone location assignment corresponding to a unique spreading code associated with the user. Quadrature amplitude modulation (QAM) and/or phase-shift keying (PSK) can be performed over at least one tone associated with the encoded symbols. Each user can transmit the encoded symbols to a receiving entity, where the receiving entity can decode each symbol received from the plurality of users to produce a distinguishable symbol for each user based on the unique spreading codes associated with each user.

23 Claims, 8 Drawing Sheets

(56) References Cited

U.S. PATENT DOCUMENTS

2004/0100928 A1* 5/2004 Ben-David .......... H04B 1/7105
 370/335
2005/0174983 A1* 8/2005 Naguleswaran ......... H04B 1/10
 370/347

* cited by examiner

SPREADING TECHNIQUES FOR FREQUENCY-SHIFT KEYING MODULATION

CLAIM OF PRIORITY UNDER 35 U.S.C. §119

The present application for patent claims priority to Provisional Application No. 62/277,305 entitled "SPREADING TECHNIQUES FOR FREQUENCY-SHIFT KEYING MODULATION" filed Jan. 11, 2016, which is assigned to the assignee hereof and hereby expressly incorporated by reference herein.

BACKGROUND

The present disclosure relates generally to wireless communication systems, and more particularly, to spreading techniques for frequency-shift keying (FSK) modulation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). Generally, a wireless multiple-access communication system can simultaneously support communication for multiple wireless terminals (e.g., user equipment (UE)), each of which can communicate with one or more base stations over downlink or uplink resources.

FSK is a conventional frequency modulation scheme used in wireless communication systems. FSK modulation is known to be power-efficient and to reduce interference between wireless devices. Therefore, for a wireless network where wireless devices are battery limited (e.g., internet-of-things, IoT, devices) and need to share the network with many other wireless devices, FSK is a good candidate for those wireless devices to modulate their uplink signals. However, when there are multiple wireless devices transmitting FSK-modulated signals to a base station, it can be difficult for the base station to decode the FSK-modulated signals to a unique signal transmitted by each of the wireless devices. Therefore, it is desirable to have techniques to handle the detection of multiple users (i.e., multi-user detection) in a wireless communications system when FSK modulation is used.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure provides for a method of decoding FSK-modulated signals received from multiple users in a wireless communications system. The method includes receiving, via a channel, a first modulated symbol from a first user equipment (UE), the first modulated symbol being FSK modulated based on a first spreading code. The method further includes receiving, via the channel, a second modulated symbol from at least one second UE, the second modulated symbol being FSK modulated based on a second spreading code different from the first spreading code. In addition, the method includes decoding, based on the first spreading code and the second spreading code, each of the first modulated symbol and the second modulated symbol to produce a distinguishable symbol transmitted by each of the first UE and the at least one second UE.

In accordance with another aspect, the present disclosure provides an apparatus (e.g., a base station) for multi-user wireless communications, the apparatus including a transceiver, a memory configured to store instructions and one or more processors communicatively coupled to receive, via the transceiver and a channel, a first modulated symbol from a first user equipment (UE), the first modulated symbol being frequency-shift keying (FSK) modulated based on a first spreading code, to receive, via the transceiver and the channel, a second modulated symbol from at least one second UE, the second modulated symbol being FSK modulated based on a second spreading code different from the first spreading code, and to decode, based on the first spreading code and the second spreading code, each of the first modulated symbol and the second modulated symbol to produce a distinguishable symbol transmitted by each of the first UE and the at least one second UE.

In accordance with another aspect, the present disclosure provides an apparatus (e.g., a base station) for multi-user wireless communications. The apparatus includes means for receiving, via a channel, a first modulated symbol from a first user equipment (UE), the first modulated symbol being frequency-shift keying (FSK) modulated based on a first spreading code. The apparatus further includes means for receiving, via the channel, a second modulated symbol from at least one second UE, the second modulated symbol being FSK modulated based on a second spreading code different from the first spreading code. In addition, the apparatus includes means for decoding, based on the first spreading code and the second spreading code, each of the first modulated symbol and the second modulated symbol to produce a distinguishable symbol transmitted by each of the first UE and the at least one second UE.

In accordance with yet another aspect, the present disclosure provides a computer-readable medium (e.g., a non-transitory medium) storing code executable by a computer for multi-user wireless communications, the code including code for receiving, via a channel, a first modulated symbol from a first user equipment (UE), the first modulated symbol being frequency-shift keying (FSK) modulated based on a first spreading code. The computer-readable medium may further include code for receiving, via the channel, a second modulated symbol from at least one second UE, the second modulated symbol being FSK modulated based on a second spreading code different from the first spreading code. In addition, the computer-readable medium may further include code for decoding, based on the first spreading code and the second spreading code, each of the first modulated symbol and the second modulated symbol to produce a distinguishable symbol transmitted by each of the first UE and the at least one second UE.

In accordance with another aspect, the present disclosure provides for a method of transmitting FSK-modulated signals in a multiple user wireless communications system. The method includes identifying, at a first UE, a first spreading code different from a second spreading code for at least one second UE. The method further includes generating, by the first UE, at least one first modulated symbol by performing FSK modulation of at least one first symbol based on the first spreading code. In addition, the method includes transmitting the at least one first modulated symbol to a base station, the base station being configured to produce, based on the first spreading code, the at least one symbol for the first UE from the first modulated symbol distinguishable from at least one second symbol produced by the base station for the at least one second UE from a second modulated symbol transmitted by the at least one second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, in an aspect, a component may be generally understood to be one of the parts that make up a system, may be hardware or software, and/or may be divided into other components.

Described herein are various aspects related to distinguishing FSK-modulated signals transmitted by multiple users (e.g., multiple UEs) in a wireless communications system. For example, in an aspect, to generate an FSK-modulated signal, data symbols can be encoded by a user in accordance with a tone location assignment corresponding to a unique spreading code associated the user. Each of the plurality of users can then transmit their respective FSK-modulated signal to a receiving entity (e.g., a base station). In an aspect, the receiving entity can decode the FSK-modulated signals received from the plurality of users based on the unique spreading codes associated with each user to produce a distinguishable symbol transmitted by each of the users. In another aspect, quadrature amplitude modulation (QAM) and/or phase-shift keying (PSK) can be utilized to modulate tones of the FSK-modulated signal before transmitting the FSK-modulated signal to the receiving entity.

Figure 1:
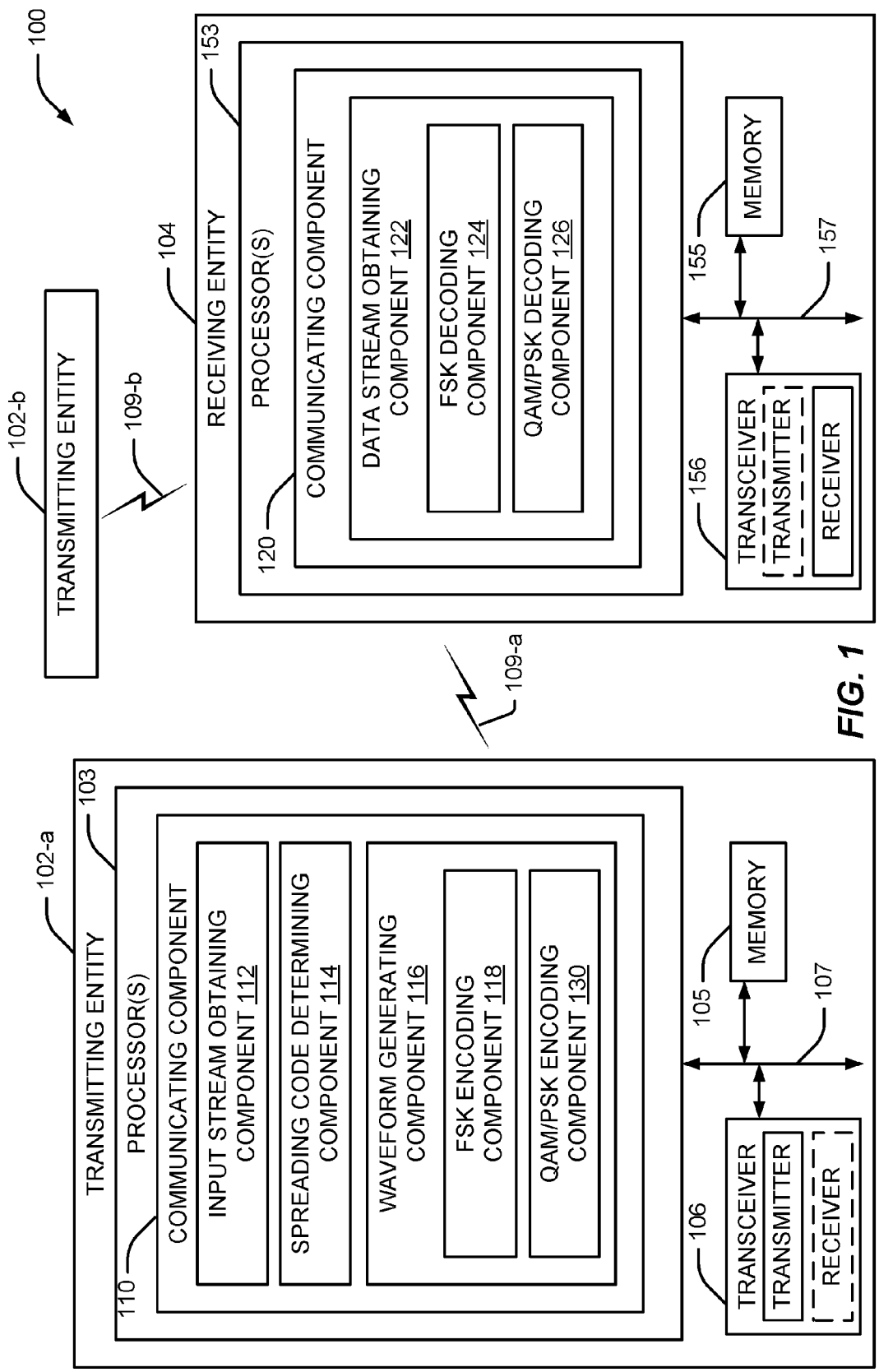
FIG. 1 is a block diagram illustrating an example of a multi-user wireless communications system for distinguishing FSK-modulated signals between users in accordance with aspects described herein.
Figure 2:
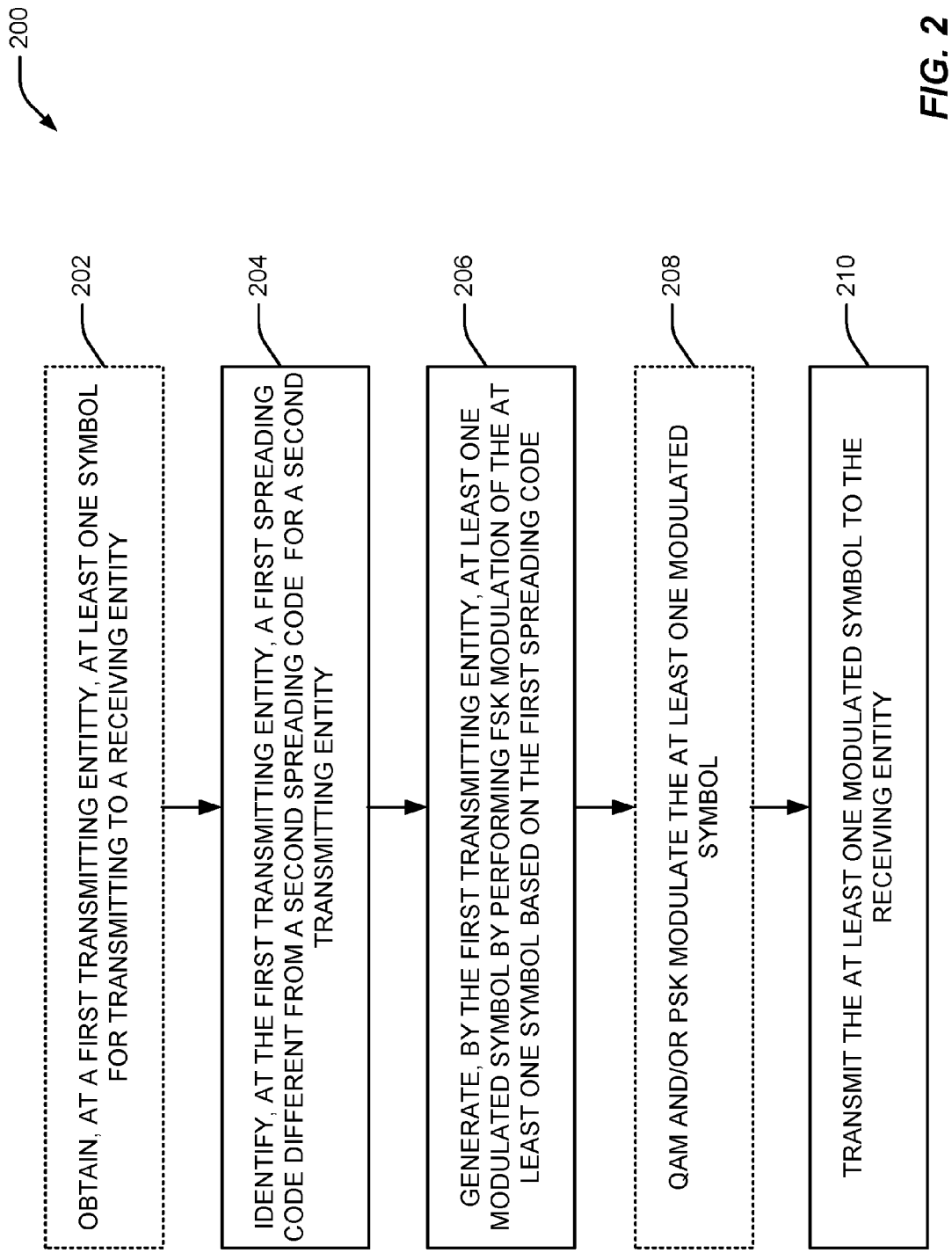
FIG. 2 is a flow diagram representing an example method for transmitting FSK-modulated signals in a multi-user wireless communications system in accordance with aspects described herein.
Figure 3:
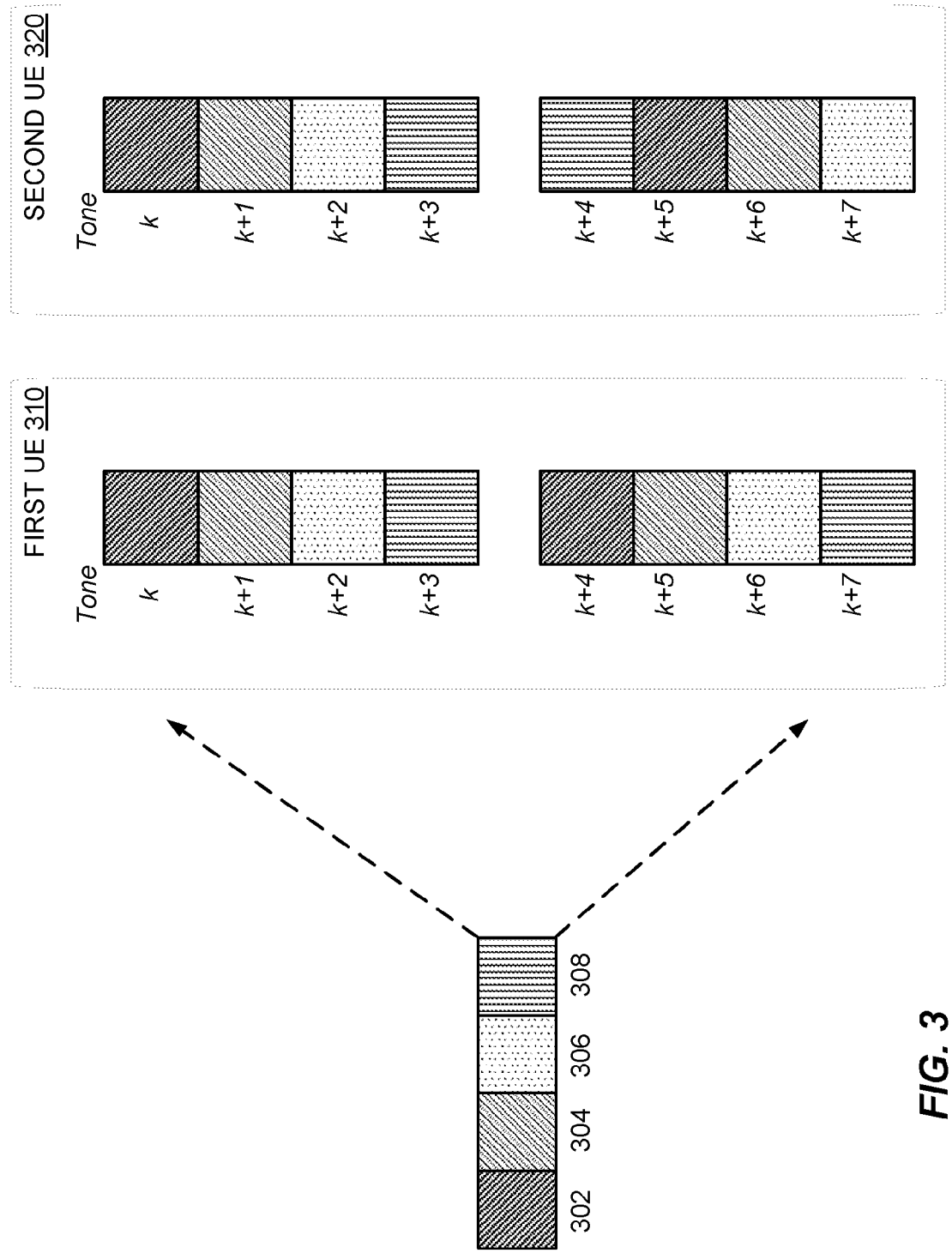
FIG. 3 is a diagram conceptually illustrating an example of a spreading technique for distinguishing four FSK (4-FSK) signals between two users in accordance with aspects described herein.
Figure 4:
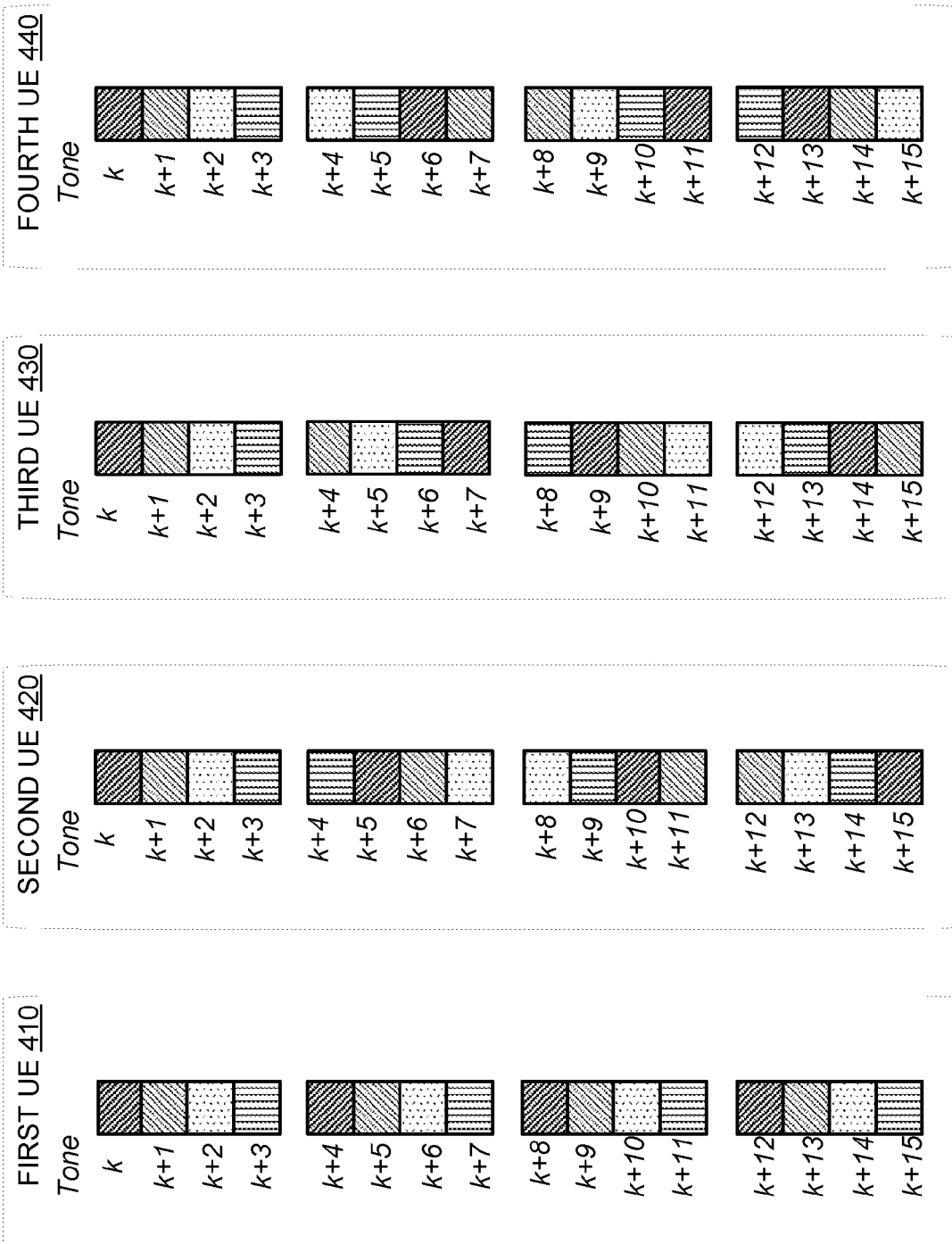
FIG. 4 is a diagram conceptually illustrating an example of a spreading technique for distinguishing 4-FSK-modulated signals between four users in accordance with aspects described herein.
Figure 5:
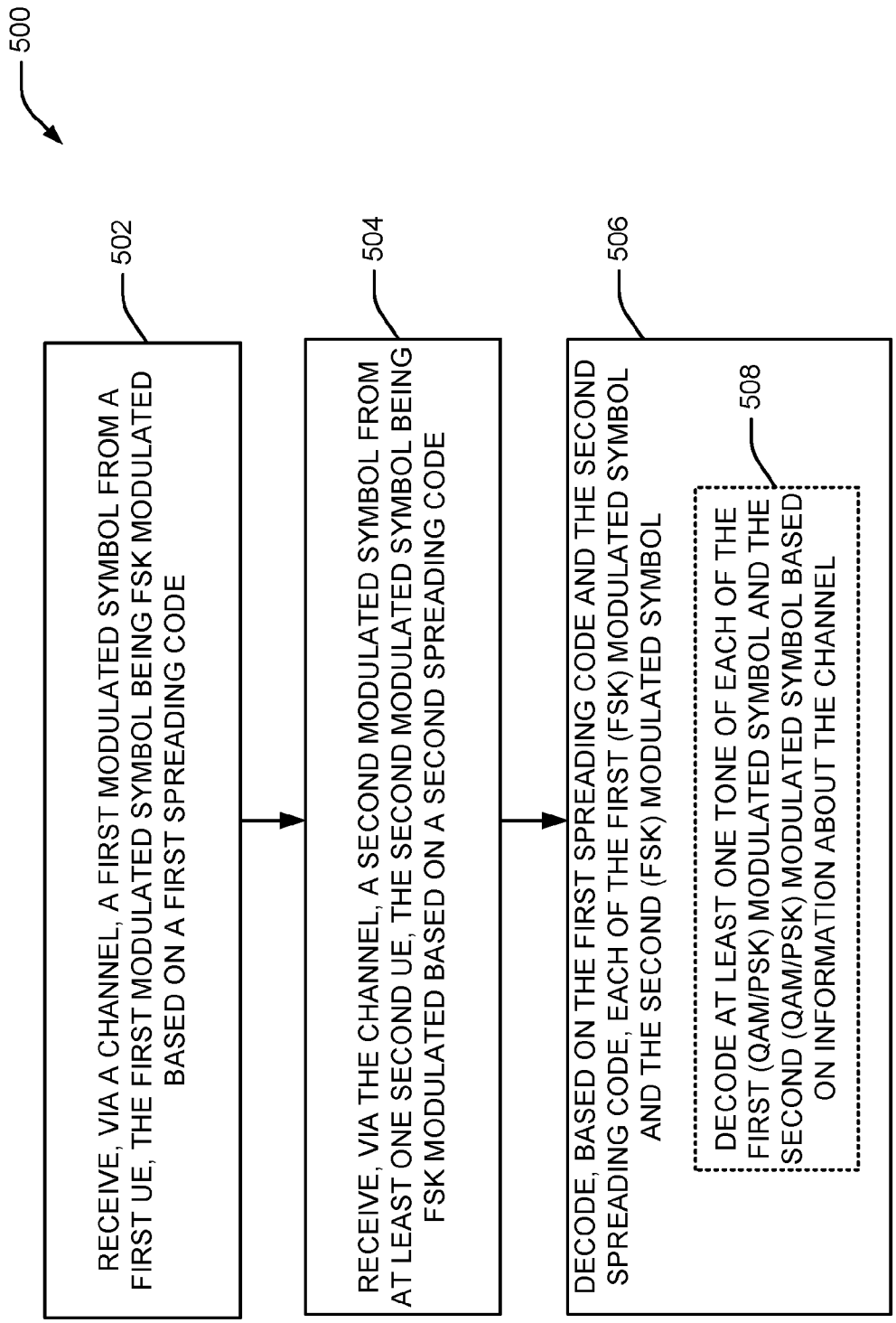
FIG. 5 is a flow diagram representing an example method for decoding FSK-modulated signals in a multi-user wireless communications system in accordance with aspects described herein.

Referring to FIGS. 1-8, aspects are depicted with reference to one or more components and one or more methods that may perform the actions or functions described herein. Although the operations described below in FIGS. 2 and 5 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. System 100 includes two transmitting entities (e.g., a first transmitting entity 102-*a* and a second transmitting entity 102-*b*) that each transmit signals to a receiving entity 104. In an example, the first transmitting entity 102-*a* and the second transmitting entity 102-*b* may be, or may include at least a portion of, a user equipment (UE) that transmits signals to receiving entity 104, which may be, or may include at least a portion of, a base station, to access a wireless network. The first transmitting entity 102-*a* and the second transmitting entity 102-*b* may be stationary or mobile. Thus, in one example, first transmitting entity 102-*a* and receiving entity 104 may have established one or more channels over which to communicate via one or more signals 109-*a*, which can be transmitted by transmitting entity 102-*a* (e.g., via transceiver 106) and received by receiving entity 104 (e.g., via transceiver 156). Similarly, second transmitting entity 102-*b* and receiving entity 104 may have established one or more channels over which to communicate via one or more signals 109-*b*. In addition, though two transmitting entities 102-*a* and 102-*b* and one receiving entity 104 are shown, it is to be appreciated that more than two transmitting entities 102-*a* (as shown) can communicate with a receiving entity 104, a transmitting entity 102-*a* can communicate with multiple receiving entities 104, and/or the like. In addition, it is to be appreciated that receiving entity 104 may also include the components for performing the functions of transmitting entity 102-*a* described below for transmitting communications, in one example.

In an aspect, transmitting entity 102-*a* may include one or more processors 103 and/or a memory 105 that may be communicatively coupled, e.g., via one or more buses 107, and may operate in conjunction with or otherwise implement a communicating component 110 for managing communications, including uplink communications of FSK-modulated signals, with receiving entity 104. For example, the various operations related to communicating component 110 may be implemented or otherwise executed by one or more processors 103 and, in an aspect, can be executed by a single processor, while in other aspects, different ones of the operations may be executed by a combination of two or more different processors. For example, in an aspect, the one or more processors 103 may include any one or any combination of a modem processor, or a baseband processor, or a digital signal processor, or an application specific integrated circuit (ASIC), or a transmit processor, receive processor, or a transceiver processor associated with transceiver 106. Further, for example, the memory 105 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 103. Moreover, memory 105 or computer-readable storage medium may be resident in the one or more processors 103, external to the one or more processors 103, distributed across multiple entities including the one or more processors 103, etc.

In particular, the one or more processors 103 and/or memory 105 may execute actions or operations defined by communicating component 110 or its subcomponents. For instance, the one or more processors 103 and/or memory 105 may execute actions or operations defined by an input stream obtaining component 112 for obtaining an input stream of one or more symbols for communicating to a receiving entity 104. In an aspect, for example, input stream obtaining component 112 may include hardware (e.g., one or more processor modules of the one or more processors 103) and/or computer-readable code or instructions stored in memory 105 and executable by at least one of the one or more processors 103 to perform the input stream obtaining operations described herein.

Further, for instance, the one or more processors 103 and/or memory 105 may execute actions or operations defined by a spreading code determining component 114 for determining a spreading code that defines tone locations for use in FSK modulating of the input stream of symbols. In an aspect, for example, spreading code determining component 114 may include hardware (e.g., one or more processor modules of the one or more processors 103) and/or computer-readable code or instructions stored in memory 105 and executable by at least one of the one or more processors 103 to perform the spreading code determining operations described herein.

Further, for instance, the one or more processors 103 and/or memory 105 may execute actions or operations defined by a waveform generating component 116 for generating a waveform for transmitting a signal to the receiving entity 104 based on a spreading code. In an aspect, for example, waveform generating component 116 may include hardware (e.g., one or more processor modules of the one or more processors 103) and/or computer-readable code or instructions stored in memory 105 and executable by at least one of the one or more processors 103 to perform the waveform generating operations described herein.

Further, for instance, the one or more processors 103 and/or memory 105 may execute actions or operations defined by a FSK encoding component 118 for modulating (e.g., encoding) the input stream of symbols according to a spreading code. In an aspect, for example, FSK encoding component 118 may include hardware (e.g., one or more processor modules of the one or more processors 103) and/or computer-readable code or instructions stored in memory 105 and executable by at least one of the one or more processors 103 to perform the FSK modulating operations described herein.

Further, for instance, the one or more processors 103 and/or memory 105 may optionally execute actions or operations defined by a quadrature amplitude modulation/phase-shift keying (QAM/PSK) encoding component 130 for performing QAM and/or PSK modulation (e.g., encoding) of tones associated with a modulated stream of symbols. In an aspect, for example, QAM/PSK encoding component 130 may include hardware (e.g., one or more processor modules of the one or more processors 103) and/or computer-readable code or instructions stored in memory 105 and executable by at least one of the one or more processors 103 to perform the QAM and/or PSK modulating operations described herein.

Similarly, in an aspect, receiving entity 104 may include one or more processors 153 and/or a memory 155 that may be communicatively coupled, e.g., via one or more buses 157, and may operate in conjunction with or otherwise implement a communicating component 120 for managing communications with at least one transmitting entity (e.g., first transmitting entity 102-*a*). For example, the various functions related to communicating component 120 may be implemented or otherwise executed by one or more processors 153 and, in an aspect, can be executed by a single processor, while in other aspects, different ones of the functions may be executed by a combination of two or more different processors, as described above. It is to be appreciated, in one example, that the one or more processors 153 and/or memory 155 may be configured as described in examples above with respect to the one or more processors 103 and/or memory 105 of transmitting entity 102-*a*.

In an example, the one or more processors 153 and/or memory 155 may execute actions or operations defined by communicating component 120 or its subcomponents. For instance, the one or more processors 153 and/or memory 155 may execute actions or operations defined by a data stream obtaining component 122 for obtaining a data stream from a signal received from transmitting entity 102-*a*, which can be provided to higher layers for processing. In an aspect, for example, data stream obtaining component 122 may include hardware (e.g., one or more processor modules of the one or more processors 153) and/or computer-readable code or instructions stored in memory 155 and executable by at least one of the one or more processors 153 to perform the data stream obtaining operations described herein.

Further, for instance, the one or more processors 153 and/or memory 155 may execute actions or operations defined by a FSK decoding component 124 for performing decoding (e.g., demodulating) on a signal received from transmitting entity 102-*a*. In an aspect, for example, FSK decoding component 124 may include hardware (e.g., one or more processor modules of the one or more processors 153) and/or computer-readable code or instructions stored in memory 155 and executable by at least one of the one or more processors 153 to perform the FSK decoding operations described herein.

Further, for instance, the one or more processors 153 and/or memory 155 may optionally execute actions or operations defined by a QAM/PSK decoding component 126 for performing decoding (e.g., demodulating) on a signal received from transmitting entity 102-*a*. In an aspect, for example, QAM/PSK decoding component 126 may include hardware (e.g., one or more processor modules of the one or more processors 153) and/or computer-readable code or instructions stored in memory 155 and executable by at least one of the one or more processors 153 to perform the QAM and/or PSK decoding operations described herein.

It is to be appreciated that transceivers 106, 156 may be configured to transmit and receive wireless signals through one or more antennas, a radio frequency (RF) front end, one or more transmitters, and one or more receivers. In an aspect, transceivers 106, 156 may be tuned to operate at specified frequencies such that transmitting entity 102-*a* and receiving entity 104 can communicate at a certain frequency. In an aspect, the one or more processors 103 may configure transceiver 106 and/or one or more processors 153 may configure transceiver 156 to operate at a specified frequency and power level based on a configuration, a communication protocol, etc. to communicate signals 109-*a*.

In an aspect, transceivers 106, 156 can operate in multiple bands (e.g., using a multiband-multimode modem, not shown) such as to process digital data sent and received using transceivers 106, 156. In an aspect, transceivers 106, 156 can be multiband and be configured to support multiple frequency bands for a specific communications protocol. In an aspect, transceivers 106, 156 can be configured to support multiple operating networks and communications protocols. Thus, for example, transceivers 106, 156 may enable transmission and/or reception of signals based on a specified modem configuration.

Where transmitting entity 102-*a* is a UE, the UE may comprise any type of mobile device, such as, but not limited to, a smartphone, cellular telephone, mobile phone, laptop computer, tablet computer, or other portable networked device that can be a standalone device, tethered to another device (e.g., a modem connected to a computer), a watch, a personal digital assistant, a personal monitoring device, an "Internet of everything" (IoE) device, a machine monitoring device, a machine to machine communication device, etc. In addition, a UE may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, a UE may be small and light enough to be considered portable and may be configured to communicate wirelessly via an over-the-air communication link using one or more OTA communication protocols described herein. Additionally, in some examples, a UE may be configured to facilitate communication on multiple separate networks via multiple separate subscriptions, multiple radio links, and/or the like.

Furthermore, where receiving entity 104 is a network entity, the network entity may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, a network entity may communicate with one or more other network entities of wireless and/or core networks.

Additionally, system 100 may include any network type, such as, but not limited to, wide-area networks (WAN), wireless networks (e.g. IEEE 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs according to this standard. As those skilled in the art will readily appreciate, various aspects described herein may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in frequency division duplexing (FDD), time division duplexing (TDD), or both modes), LTE-Advanced (LTE-A) (in FDD, TDD, or both modes), $5^{th}$ Generation Mobile Network (5G), CDMA2000, Evolution- Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., transmitting entity 102-a and/or receiving entity 104) may be coupled to a core network via one or more wired or wireless connections.

FIG. 2 illustrates a method 200 for transmitting at least one modulated symbol from a first transmitting entity to a receiving entity. Method 200 includes, optionally, at Block 202, obtaining at least one symbol for transmitting to the receiving entity. In an aspect, input stream obtaining component 112 of the first transmitting entity 102-a, e.g., in conjunction with processor(s) 103 and/or memory 105, can obtain at least one symbol for transmitting to receiving entity 104. For example, the at least one symbol may be a next symbol in a sequence of symbols to be modulated for transmission from the first transmitting entity 102-a to the receiving entity 104.

Method 200 includes, at Block 204, identifying a first spreading code for the first transmitting entity different from a second spreading code for a second transmitting entity. In an aspect, spreading code determining component 114 of the first transmitting entity 102-a, e.g., in conjunction with processor(s) 103 and/or memory 105, can identify the first spreading code. In an aspect, spreading code determining component 114 can be configured to assign a set of tone locations for modulating at least one symbol at the first transmitting entity 102-a. It is to be appreciated that the set of tone locations assigned for modulating the at least one symbol at the first transmitting entity 102-a may be different from a set of tone locations assigned for modulating the at least one symbol at the second transmitting entity 102-b. It is to be further appreciated that the first spreading code and the second spreading code may be configured to minimize an overlap of tones used by the first and second transmitting entities 102-a, 102-b for modulating the at least one symbol. As such, in an aspect, the spreading code determining component 114 can identify or select the first spreading code and the second spreading code from a set of spreading codes (e.g., a set of spreading codes stored in memory 105) that is configured to minimize an overlap of tones between users (e.g., first transmitting entity 102-a and second transmitting entity 102-b).

Method 200 includes, at Block 206, generating at least one modulated symbol by performing FSK modulation of the at least one symbol based on the first spreading code. In an aspect, FSK encoding component 118 of the first transmitting entity 102-a, e.g., in conjunction with processor(s) 103 and/or memory 105, can modulate (e.g., encode) the at least one symbol using FSK based on the first spreading code identified at, e.g., block 204. For example, in an aspect, the FSK encoding component 118 can encode the at least one symbol using M-ary FSK, where M is a value greater than or equal to two, based on the first spreading code.

An example is depicted in FIG. 3, where a first transmitting entity, e.g. first UE 310, and a second transmitting entity, e.g. second UE 320, encode an input stream of symbols using four FSK (4-FSK) based on a first spreading code and a second spreading code, respectively. Each of UE 310 and UE 320 may include or may be examples of transmitting entities 102-a and 102-b shown in FIG. 1. In an aspect, the input stream of symbols may include, for example, four symbols, e.g. symbols 302, 304, 306, and 308. In this example, the first UE 310 encodes symbol 302 as tone k and tone k+4. The first UE 310 encodes the next symbol 304 as tone k+1 and tone k+5. The first UE 310 encodes the next symbol 306 as tone k+2 and tone k+6. The first UE 310 encodes the subsequent symbol 308 as tone k+3 and tone k+7. In this example, the first spreading code, that is, the tone assignment used by first UE 310, is designed such that each symbol encoded by the first UE 310 does not overlap with a symbol encoded by the second UE 320 at more than one tone location. For example, the symbol 302 is encoded by the second UE 320 as tone k and tone k+5. The next symbol 304 is encoded by the second UE 320 as tone k+1 and tone k+6. The next symbol 306 is encoded by the second UE 320 as tone k+2 and tone k+7. The subsequent symbol 308 is encoded by the second UE 320 as tone k+3 and tone k+4. In this example, each symbol is encoded by the first UE 310 and second UE 320 using a spreading factor of two (e.g., each symbol 302, 304, 306, and/or 308 is spread over two tones). It is to be appreciated that a spreading factor equal to a value greater than two may also be used to encode each symbol at a UE. For example, in an aspect, the spreading factor may equal the number of UEs communicating with receiving entity 104.

For example, referring to FIG. 4, four transmitting entities, e.g. first UE 410, second UE 420, third UE 430, and fourth UE 440, may each communicate with receiving entity 104 and encode an input stream of symbols, e.g., symbols 302, 304, 306, and 308 of FIG. 3, using 4-FSK based on a first spreading code, a second spreading code, a third spreading code, and a fourth spreading code, respectively. In this example, each of the first UE 410, second UE 420, third UE 430, and fourth UE 440 can encode each of the symbols as a first tone, second tone, third tone, and fourth tone (e.g., the spreading factor is four). It is to be appreciated that, in this example, the spreading codes are configured such that any two symbols do not overlap at more than two tone locations.

Referring again to FIG. 2, method 200 further includes, at Block 210, transmitting the at least one modulated symbol to a receiving entity, e.g., receiving entity 104. In an aspect, waveform generating component 116 and/or transceiver 106 of the first transmitting entity 102-a, e.g., in conjunction with processor(s) and/or memory 105, can generate a waveform for transmitting each symbol FSK-modulated at, e.g., block 206. For example, in an aspect, transceiver 106, or a portion thereof, e.g., in conjunction with processor(s) 103 and/or memory 105, can transmit the waveform (e.g. signal 109-a) to the receiving entity 104.

In another aspect, QAM/PSK encoding component 130, e.g., in conjunction with processor(s) 103 and/or memory 105, can optionally modulate (e.g., encode), at Block 208, each FSK-modulated symbol using QAM and/or PSK modulation. For example, QAM/PSK encoding component 130, e.g., in conjunction with processor(s) 103 and/or memory 105, can optionally modulate at least one tone associated with each FSK-modulated symbol using QAM and/or PSK modulation to generate the waveform for transmitting the FSK-modulated symbols. For example, the QAM/PSK encoding component 130 can apply different known QAM and/or PSK modulation techniques to further modulate each tone associated with each FSK-modulated symbol.

FIG. 5 illustrates an example method 500 for decoding (e.g., demodulating) signals received from multiple transmitting entities (e.g., the first UE 310 and the second UE 320 illustrated in FIG. 3). Method 500 includes, at Block 502, receiving at least a first modulated symbol from a first UE, where the first modulated symbol is FSK modulated based on a first spreading code. In an aspect, data stream obtaining component 122, e.g., in conjunction with processor(s) 153, memory 155, and/or transceiver 156, of the receiving entity 104 can receive one or more modulated symbols from first UE 310 (FIG. 3). Each of the modulated symbols can be transmitted by the first UE 310 (FIG. 3) in accordance with the waveform generation aspects described herein (e.g., by waveform generating component 116 and/or its subcomponents, using the method 200 of FIG. 2, etc.).

Method 500 includes, at Block 504, receiving at least a second modulated symbol from at least one second UE, where the second modulated symbol is FSK modulated based on a second spreading code. In an aspect, data stream obtaining component 122, e.g., in conjunction with processor(s) 153, memory 155, and/or transceiver 156, of the receiving entity 104 can receive one or more modulated symbols from at least one second UE (e.g., second UE 320 (FIG. 3)). Each of the modulated symbols can be transmitted by the at least one second UE in accordance with the waveform generation aspects described herein (e.g., by waveform generating component 116 and/or its subcomponents, using the method 200 of FIG. 2, etc.).

Method 500 also includes, at Block 506, performing decoding of each of the first modulated symbol and the second modulated symbol based on the first spreading code and the second spreading code. In an aspect, data stream obtaining component 122, e.g., in conjunction with processor(s) 153 and/or memory 155, can perform decoding of each of the first modulated symbol and the second modulated symbol to produce a distinguishable symbol transmitted by each of the first UE 310 (FIG. 3) and the at least one second UE (e.g., second UE 320 (FIG. 3)). That is, based on the first spreading code and the second spreading code, it is possible to distinguish symbols transmitted by different UEs.

Block 506 may optionally include, at Block 508, decoding of each of the first modulated symbol and the second modulated symbol based on information about the channel, where at least one tone of each of the first modulated symbol and the second modulated symbol is further QAM and/or PSK modulated.

Figure 6:
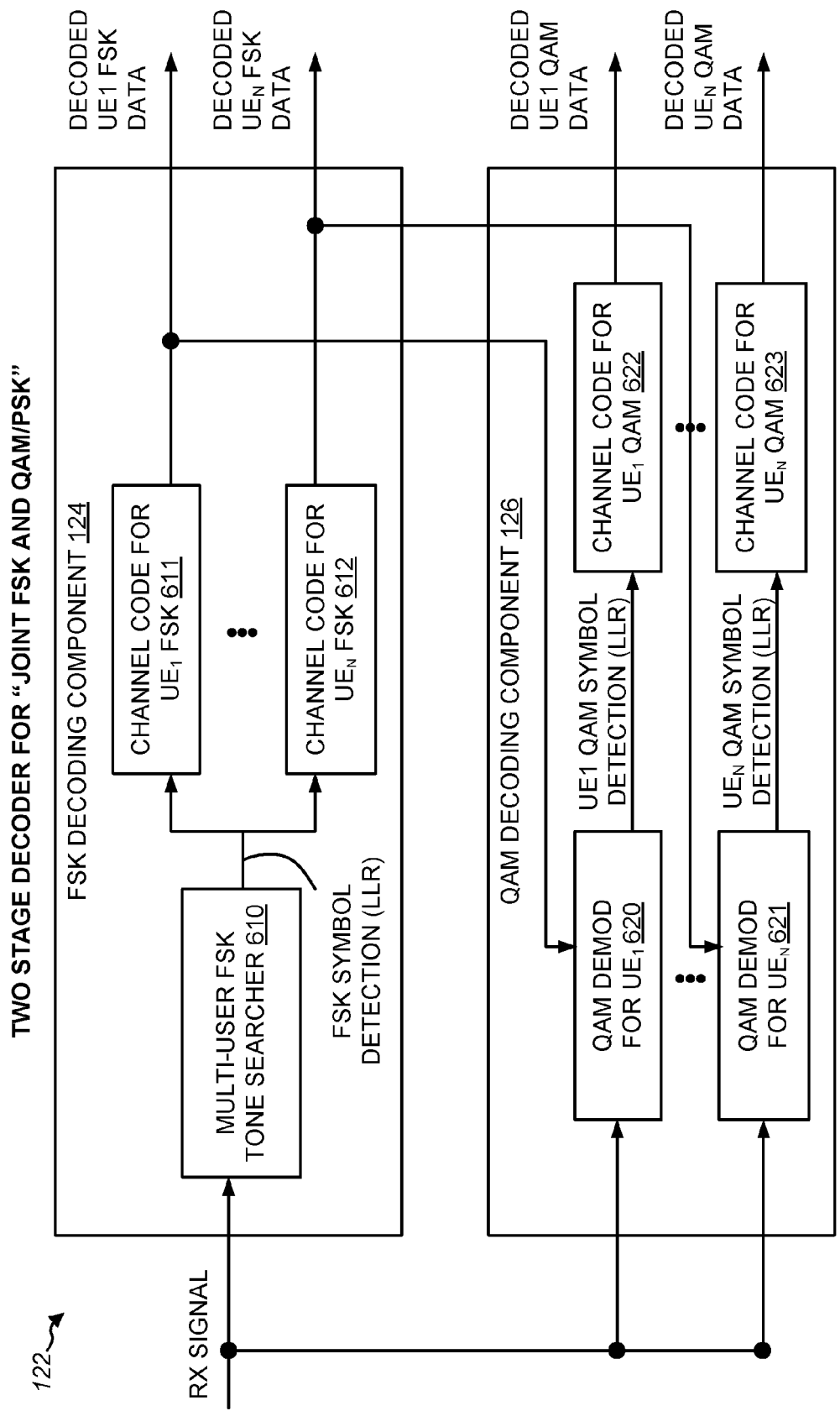
FIG. 6 is a diagram conceptually illustrating an example of performing decoding of FSK-modulated signals received from two users in accordance with aspects described herein.

In an aspect, as illustrated in FIG. 6, the data stream obtaining component 122 includes a FSK decoding component 124 for performing FSK decoding of signals received from multiple transmitting entities (e.g., first transmitting entity 102-$a$ and second transmitting entity 102-$b$). In an aspect, the FSK decoding component 124 includes a multi-user FSK tone searcher 610 for detecting FSK tones received from the plurality of transmitting entities 102-$a$, 102-$b$. The multi-user FSK tone searcher 610 can distinguish FSK tones of each of the transmitting entities 102-$a$, 102-$b$ based on a different spreading code used by each transmitting entity 102-$a$, 102-$b$ to modulate symbols. The FSK decoding component 124 further includes two or more channel code decoders (e.g., a first channel decoder 611 and a second channel decoder 612) for decoding the detected FSK tones to produce distinguishable decoded FSK data for each of the plurality of transmitting entities 102-$a$, 102-$b$. Each channel code decoder may be associated with a different wireless device (e.g., a different UE). For example, the first channel code decoder 611 may be associated with a first UE, and the second channel code decoder 612 may be associated with a second UE.

Figure 7:
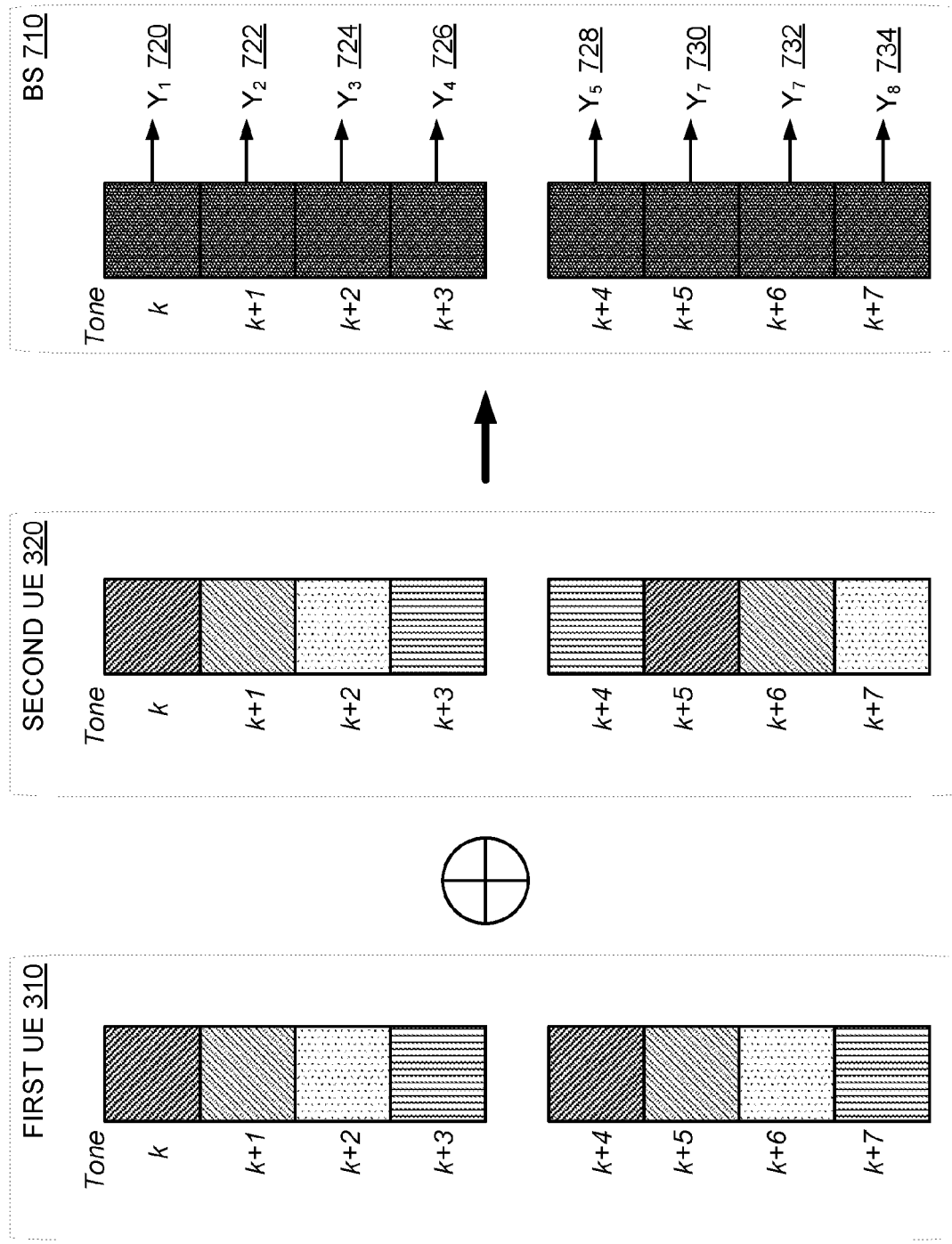
FIG. 7 is a block diagram illustrating an example two stage decoder for decoding FSK and QAM/PSK modulated signals in a multi-user wireless communications system in accordance with aspects described herein.

An example is depicted in FIG. 7 where a base station 710, decodes tones received from the first UE 310 and the second UE 320. The base station 710 may include or may be an example of the receiving entity 104 shown in FIG. 1. Each of the first UE 310 and the second UE 320 may include or may be examples of transmitting entities 102-$a$ and 102-$b$ shown in FIG. 1.

In an aspect, the multi-user FSK tone searcher 610 (FIG. 6) of the base station 710 can measure the power of each FSK tone (e.g., power 720, 722, 724, 726, 728, 730, 732, and 734 of tones k through k+7, respectively). In an aspect, the multi-user FSK searcher 610 (FIG. 6) can perform hard-decision or soft-decision demodulation to distinguish FSK tones of each UE (e.g., the first UE 310 and the second UE 320). For example, in an aspect, the multi-user FSK searcher 610 (FIG. 6) can calculate or determine (e.g., from a table or other data array) the maximum power among $|720|^2+|728|^2$, $|722|^2+|730|^2$, $|724|^2+|732|^2$, and $|726|^2+|734|^2$, in accordance with a first spreading code used by the first UE 310. For example, in this aspect, the multi-user FSK searcher 610 (FIG. 6) can select the combination of tone locations having the maximum power as a possible combination of tone locations used by the first UE 310 for performing FSK modulation. Alternatively, in another aspect, the multi-user FSK searcher 610 (FIG. 6) can select (e.g., from a table or other data array) all combinations of tone locations corresponding to the first spreading code (e.g., (k, k+4), (k+1, k+5), (k+2, k+6), and (k+3, k+7)) as possible combinations of tone locations used by the first UE 310 for performing FSK modulation. In this aspect, the multi-user FSK searcher 610 (FIG. 6) can compute a log-likelihood ratio (LLR) for each of the possible combinations of tone locations based on the measured power of each tone. Similarly, in an aspect, the multi-user FSK searcher 610 (FIG. 6) can calculate or determine (e.g., from a table or other data array) the maximum power among $|720|^2+|730|^2$, $|722|^2+|732|^2$, $|724|^2+|734|^2$, and $|726|^2+|728|^2$, in accordance with a second spreading code used by the second UE 320. For example, in this aspect, the multi-user FSK searcher 610 (FIG. 6) can select the combination of tone locations having the maximum power as a possible combination of tone locations used by the second UE 320 for performing FSK modulation. Alternatively, in another aspect, the multi-user FSK searcher 610 (FIG. 6) can select (e.g., from a table or other data array) all combinations of tone locations corresponding to the second spreading code (e.g., (k, k+5), (k+1, k+6), (k+2, k+7), and (k+3, k+4)) as possible combinations of tone locations used by the second UE 320 for performing FSK modulation. In this aspect, the multi-user FSK searcher 610 (FIG. 6) can compute a log-likelihood ratio (LLR) for each of the possible combinations of tone locations based on the measured power of each tone.

The first channel code decoder 611 and the second channel code decoder 612 of the base station 710 can then each decode FSK data received from the first UE 310 and the second UE 320, respectively. For example, in an aspect, the first channel code decoder 611 and the second channel code decoder 612 can decode FSK data associated with the first UE 310 and the second UE 320, respectively, based on the combination of tone locations calculated or determined as having the maximum power. Alternatively, in another aspect, the first channel code decoder 611 can decode FSK data associated with the first UE 310 based on the computed LLRs of each of the combinations of tone locations corresponding to the first spreading code. Similarly, the second channel code decoder 612 can decode FSK data associated with the second UE 320 based on the computed LLRs of each of the combinations of tone locations corresponding to the second spreading code.

For example, the base station 710 can receive a first symbol encoded as tone k and tone k+4 from the first UE 310 and can simultaneously receive a second symbol encoded as tone k and tone k+5 from the second UE 320. In this example, the multi-user FSK tone searcher 610 can calculate or determine that the maximum power corresponding to the first spreading code (e.g., the maximum power among $|720|^2+|728|^2$, $|722|^2+|730|^2$, $|724|^2+|732|^2$, and $|726|^2+|734|^2$) is $|720|^2+|728|^2$. Accordingly, the multi-user FSK tone searcher 610 can select tone k and tone k+4 as possible tone locations used by the first UE 310 for performing FSK modulation (e.g., encoding), and the first channel code decoder 611 can decode FSK data associated with the first UE 310 based on the selected possible tone locations. Further, in this example, the multi-user FSK tone searcher 610 can determine that the maximum power corresponding to the second spreading code (e.g., the maximum power among $|720|^2+|730|^2$, $|722|^2+|732|^2$, $|724|^2+|734|^2$, and $|726|^2+|728|^2$) is $|720|^2+|730|^2$. Accordingly, the multi-user FSK tone searcher 610 can select tone k and tone k+5 as possible tone locations used by the second UE 320 for performing FSK modulation, and the second channel code decoder 612 can decode FSK data associated with the second UE 320 based on the selected possible tone locations.

In an aspect, as illustrated in FIG. 6, the data stream obtaining component 122 optionally includes a QAM decoding component 126 for QAM (and/or PSK) decoding (e.g., demodulating) of signals received from the multiple transmitting entities 102-a, 102-b. In an aspect, the QAM decoding component 126 includes multiple QAM demodulators (e.g., 620 and 621). Each of the QAM demodulators can receive decoded FSK data from a respective channel code decoder (e.g., 611 and 612), detect at least one QAM (and/or PSK) modulated symbol associated with the FSK data, and send the at least one detected QAM (and/or PSK) symbol to a respective channel code decoder (e.g., 622 or 623).

For example, in an aspect, each of the QAM demodulators 620, 621 can perform hard-decision or soft-decision demodulation. For example, using hard-decision demodulation, each of the QAM demodulators 620, 621 can detect a possible QAM (and/or PSK) symbol associated with the FSK data. Each of the QAM demodulators 620, 621 can send the detected possible QAM (and/or PSK) symbol to the respective channel code decoder 622 or 623. Alternatively, using soft-decision demodulation, each of the QAM demodulators 620, 621 can detect multiple possible QAM (and/or PSK) symbols associated with the FSK data and compute a LLR for each of the possible QAM (and/or PSK) symbols (e.g., by utilizing information about the channel). Each of the QAM demodulators 620, 621 can send all of the detected possible QAM (and/or PSK) symbols, as well as the computed LLRs, to the respective channel code decoder 622 or 623.

The respective channel code decoder 622 or 623 can then decode QAM (and/or PSK) data associated with each transmitting entity 102-a, 102-b based on the detected possible QAM (and/or PSK) symbols. For example, the channel code decoders 622, 623 can decode QAM (and/or PSK) data associated with transmitting entity 102-a and transmitting entity 102-b, respectively, based on the computed LLRs of the detected possible QAM (and/or PSK) symbols.

Figure 8:
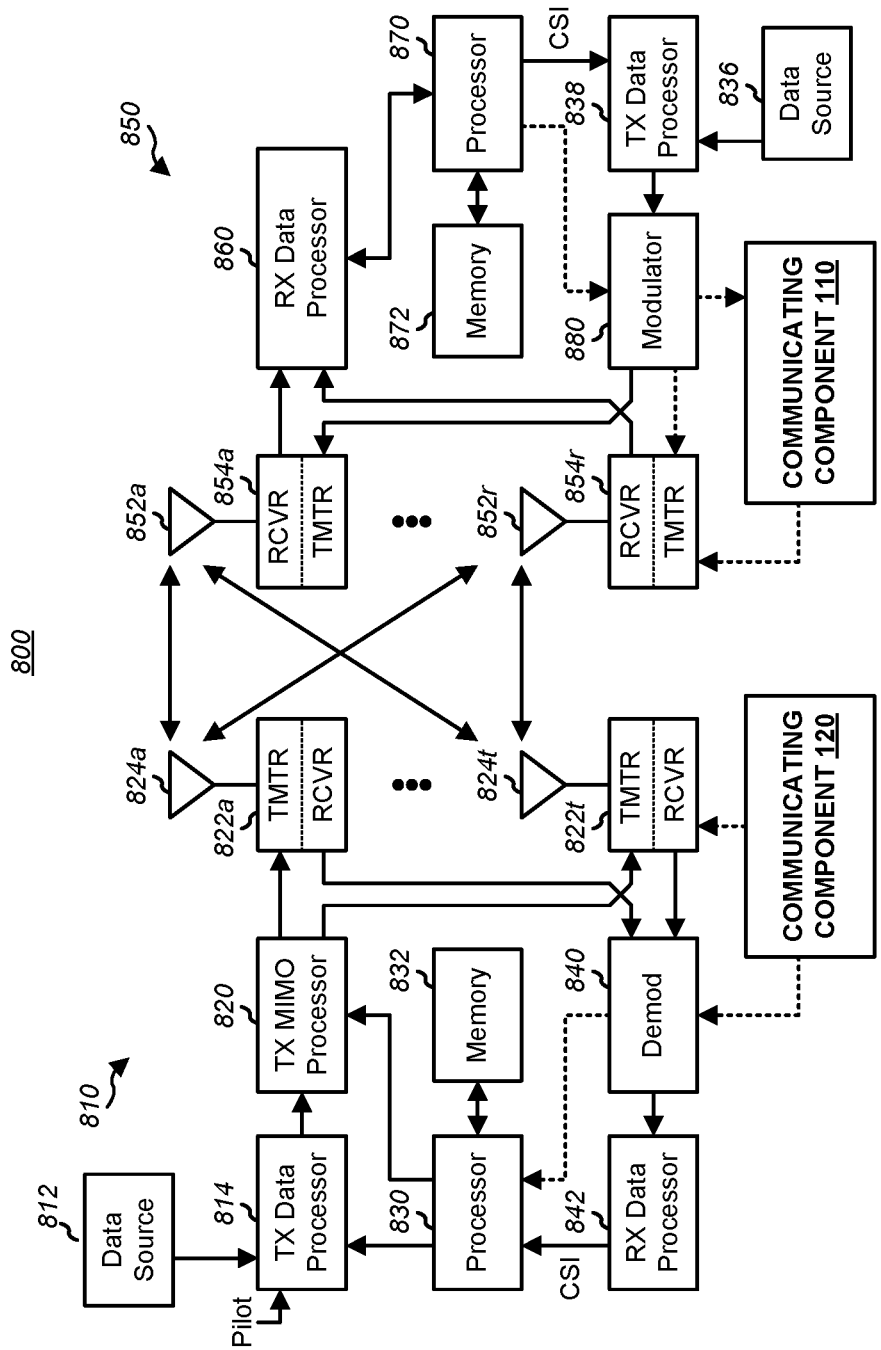
FIG. 8 is a diagram illustrating an example of an evolved Node B and user equipment in a wireless communication network.

FIG. 8 is a block diagram of an embodiment of a base station 810 and a UE 850 in a MIMO system 800. For example, base station 810 may include a receiving entity 104, and/or one or more components thereof, such as a communicating component 120, as described herein. Similarly, UE 850 may include a transmitting entity 102-a, and/or one or more components thereof, such as a communicating component 110, as described herein. At the base station 810, traffic data for a number of data streams is provided from a data source 812 to a transmit (TX) data processor 814.

In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., FSK, QAM, and/or PSK) selected for that data stream to provide modulation symbols. The data rate, coding, and modulation for each data stream may be determined by instructions performed by processor 830.

The modulation symbols for all data streams are then provided to a TX MIMO processor 820, which may further process the modulation symbols (e.g., for OFDM). TX MIMO processor 820 then provides $N_T$ modulation symbol streams to $N_T$ transmitters (TMTR) 822a through 822t. In certain embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At UE 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at base station 810.

A processor 870 periodically determines which pre-coding matrix to use (discussed below). Processor 870 formulates a reverse link message comprising a matrix index portion and a rank value portion. Processor 870 is additionally coupled to a memory 872 that may store instructions, parameters, and/or other data related to executing functions described herein (e.g., function of communicating component 110).

The reverse link message may comprise various types of information regarding the communication link and/or the received data stream. The reverse link message is then processed by a TX data processor 838, which also receives traffic data for a number of data streams from a data source 836, modulated by a modulator 880, conditioned by transmitters 854a through 854r, and transmitted back to base station 810.

At base station 810, the modulated signals from UE 850 are received by antennas 824, conditioned by receivers 822, demodulated by a demodulator 840, and processed by a RX data processor 842 to extract the reserve link message transmitted by the UE 850. Processor 830 then determines which pre-coding matrix to use for determining the beamforming weights then processes the extracted message. Processor 830 is additionally coupled to a memory 832 that may store instructions, parameters, and/or other data related to executing functions described herein (e.g., function of communicating component 120).

Several aspects of a telecommunications system have been presented with reference to a W-CDMA system. As those skilled in the art will readily appreciate, various aspects described herein may be extended to other telecommunication systems, network architectures and communication standards.

By way of example, various aspects described herein may be extended to other UMTS systems such as W-CDMA, TD-SCDMA, High Speed Downlink Packet Access (HS-DPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects described herein, an element, or any portion of an element, or any combination of elements may be implemented with a "processing system" that includes one or more processors (see e.g., FIG. 1). Examples of processors include microprocessors, microcontrollers, graphics processing units (GPUs), central processing units (CPUs), application processors, digital signal processors (DSPs), reduced instruction set computing (RISC) processors, system-on-a-chip (SoC), baseband processors, field programmable gate arrays (FPGAs), programmable logic devices (PLDs), state machines, gated logic, discrete hardware circuits, and other suitable hardware configured to perform the various functionality described herein. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the functionality described herein depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A method of multi-user wireless communications, comprising:
   receiving, via a channel, a first modulated symbol from a first user equipment (UE), the first modulated symbol being frequency-shift keying (FSK) modulated based on a first spreading code;
   receiving, via the channel, a second modulated symbol from at least one second UE, the second modulated symbol being FSK modulated based on a second spreading code different from the first spreading code; and decoding, based on the first spreading code and the second spreading code, each of the first modulated symbol and the second modulated symbol to produce a distinguishable symbol transmitted by each of the first UE and the at least one second UE.

2. The method of claim 1, wherein:
at least one tone of each of the first modulated symbol and the second modulated symbol is further quadrature amplitude modulation (QAM) or phase-shift keying (PSK) modulated, and
the decoding of each of the first modulated symbol and the second modulated symbol is further based on information about the channel.

3. The method of claim 1, wherein:
the first spreading code corresponds to a first location assignment for tones in the first modulated symbol, and
the second spreading code corresponds to a second location assignment for tones in the second modulated symbol, the second location assignment being different from the first location assignment.

4. The method of claim 3, wherein:
the first modulated symbol having at least one repeated symbol, tone locations for each repeated symbol of the first modulated symbol being assigned according to the first location assignment, and
the second modulated symbol having at least one repeated symbol, tone locations for each repeated symbol of the second modulated symbol being assigned according to the second location assignment.

5. The method of claim 3, wherein the first location assignment and the second location assignment are configured to minimize tone overlap between the first modulated symbol and the second modulated symbol.

6. The method of claim 1, wherein the first modulated symbol and the second modulated symbol are M-ary FSK modulated, where M is greater than 2.

7. The method of claim 1, wherein the decoding comprises:
determining a power for each tone associated with the first modulated symbol and the second modulated symbol;
identifying the distinguishable symbol transmitted by the first UE based on the power of each tone and the first spreading code; and
identifying the distinguishable symbol transmitted by the at least one second UE based on the power of each tone and the second spreading code.

8. The method of claim 1, wherein:
at least one tone of each of the first modulated symbol and the second modulated symbol is further QAM or PSK modulated, and
the decoding includes:
a first decoding of the first modulated symbol and the second modulated symbol to produce FSK decoded data; and
a second decoding, based on the FSK decoded data and the information about the channel, of the first modulated symbol and the second modulated symbol to produce the distinguishable symbol transmitted by each of the first UE and the at least one second UE.

9. An apparatus for multi-user wireless communications, comprising:
a transceiver;
a memory configured to store instructions; and
one or more processors communicatively coupled to the transceiver and the memory, the one or more processors configured to execute the instructions to:
receive, via the transceiver and a channel, a first modulated symbol from a first user equipment (UE), the first modulated symbol being frequency-shift keying (FSK) modulated based on a first spreading code;
receive, via the transceiver and the channel, a second modulated symbol from at least one second UE, the second modulated symbol being FSK modulated based on a second spreading code different from the first spreading code; and
decode, based on the first spreading code and the second spreading code, each of the first modulated symbol and the second modulated symbol to produce a distinguishable symbol transmitted by each of the first UE and the at least one second UE.

10. The apparatus of claim 9, wherein:
at least one tone of each of the first modulated symbol and the second modulated symbol is further quadrature amplitude modulation (QAM) or phase-shift keying (PSK) modulated, and
the decoding of each of the first modulated symbol and the second modulated symbol is further based on information about the channel.

11. The apparatus of claim 9, wherein:
the first spreading code corresponds to a first location assignment for tones in the first modulated symbol, and
the second spreading code corresponds to a second location assignment for tones in the second modulated symbol, the second location assignment being different from the first location assignment.

12. The apparatus of claim 11, wherein:
the first modulated symbol having at least one repeated symbol, tone locations for each repeated symbol of the first modulated symbol being assigned according to the first location assignment, and
the second modulated symbol having at least one repeated symbol, tone locations for each repeated symbol of the second modulated symbol being assigned according to the second location assignment.

13. The apparatus of claim 11, wherein the first location assignment and the second location assignment are configured to minimize tone overlap between the first modulated symbol and the second modulated symbol.

14. The apparatus of claim 9, wherein the first modulated symbol and the second modulated symbol are M-ary FSK modulated, where M is greater than 2.

15. The apparatus of claim 9, wherein to decode each of the first modulated symbol and the second modulated symbol, the one or more processors are further configured to:
determine a power for each tone associated with the first modulated symbol and the second modulated symbol;
identify the distinguishable symbol transmitted by the first UE based on the power of each tone and the first spreading code; and
identify the distinguishable symbol transmitted by the at least one second UE based on the power of each tone and the second spreading code.

16. The apparatus of claim 9, wherein:
at least one tone of each of the first modulated symbol and the second modulated symbol is further QAM or PSK modulated, and
the decoding includes:
a first decoding of the first modulated symbol and the second modulated symbol to produce FSK decoded data; and
a second decoding, based on the FSK decoded data and the information about the channel, of the first modulated symbol and the second modulated symbol to produce the distinguishable symbol transmitted by each of the first UE and the at least one second UE.

17. An apparatus for multi-user wireless communications, comprising:
    means for receiving, via a channel, a first modulated symbol from a first user equipment (UE), the first modulated symbol being frequency-shift keying (FSK) modulated based on a first spreading code, the means further for receiving, via the channel, a second modulated symbol from at least one second UE, the second modulated symbol being FSK modulated based on a second spreading code different from the first spreading code; and
    means for decoding, based on the first spreading code and the second spreading code, each of the first modulated symbol and the second modulated symbol to produce a distinguishable symbol transmitted by each of the first UE and the at least one second UE.

18. A method of multi-user wireless communications, comprising:
    identifying, at a first UE, a first spreading code different from a second spreading code for a second UE;
    generating, by the first UE, at least one first modulated symbol by performing frequency-shift keying (FSK) modulation of at least one first symbol based on the first spreading code; and
    transmitting the at least one first modulated symbol to a base station, the base station being configured to produce, based on the first spreading code, the at least one first symbol from the at least one first modulated symbol distinguishable from at least one second symbol produced by the base station for the second UE from at least one second modulated symbol transmitted by the second UE.

19. The method of claim 18, wherein generating the at least one first modulated symbol further comprises:
    performing quadrature amplitude modulation (QAM) or phase-shift keying (PSK) modulation of at least one tone of the at least one first modulated symbol.

20. The method of claim 18, wherein the first spreading code corresponds to a first location assignment for tones in the first modulated symbol.

21. The method of claim 20, wherein the second spreading code corresponds to a second location assignment for tones in the second modulated symbol, the second location assignment being different from the first location assignment.

22. The method of claim 20, wherein generating the at least one first modulated symbol further comprises:
    assigning the at least one first symbol to a plurality of tone locations according to the first location assignment.

23. The method of claim 18, wherein the FSK modulation comprises M-ary FSK modulation, and wherein M is greater than 2.

* * * * *